March 28, 1967    C. F. BACHLE ETAL    3,311,096
VARIABLE COMPRESSION RATIO PISTON AND VALVE
Filed July 7, 1965    2 Sheets-Sheet 1

INVENTORS
CARL F. BACHLE &
ROSWELL E. CARNEY
BY
Barnes, Kisselle, Raisch & Choate
ATTORNEYS

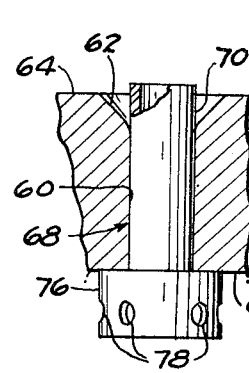
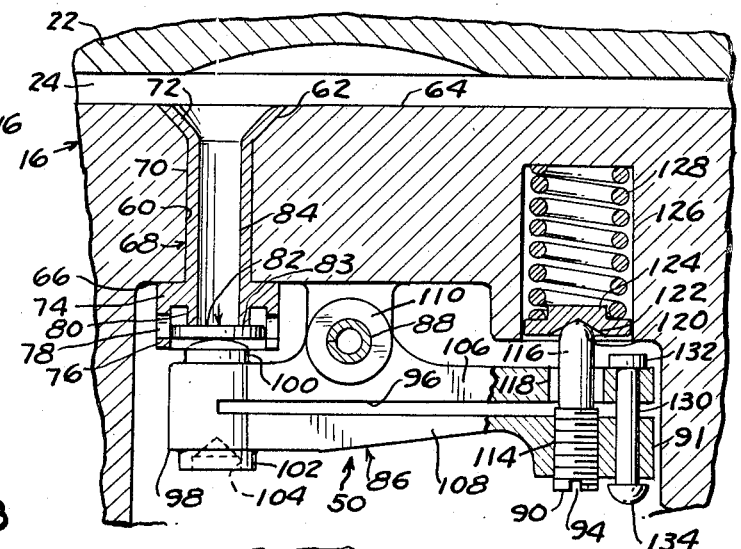
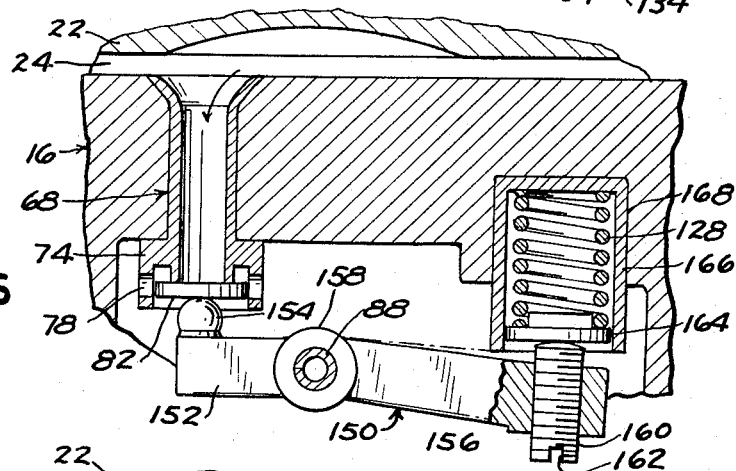
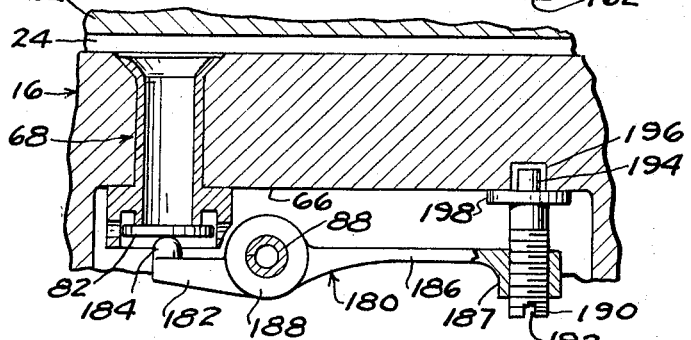

United States Patent Office 3,311,096
Patented Mar. 28, 1967

3,311,096
VARIABLE COMPRESSION RATIO PISTON
AND VALVE
Carl F. Bachle, Grosse Pointe Farms, and Roswell E. Carney, Grosse Pointe Woods, Mich., assignors to Continental Aviation and Engineering Corporation, Detroit, Mich., a corporation of Virginia
Filed July 7, 1965, Ser. No. 470,008
13 Claims. (Cl. 123—78)

This invention relates to improvements in fluid pressure regulating devices, and more particularly to improvements in reciprocating regulating pistons of the variable compression ratio (VCR) type such as those disclosed in U.S. Mansfield Patents Nos. 2,742,027, 3,014,468, and 3,038,458.

An object of the present invention is to provide an improved VCR piston which is operable to regulate maximum combustion chamber pressure in a uniform manner regardless of engine speed.

Another object is to provide an improved pressure regulating discharge valve for a VCR piston which is speed compensated by dynamic forces acting on the valve mechanism to thereby regulate hydraulic control of the piston in a manner which insures uniform maintenance by the VCR piston of the maximum desired combustion chamber pressure regardless of engine speed.

A further object is to provide an improved VCR piston and regulating valve construction which requires a minimum of fluid seals and passageways in the piston, which is inexpensive in construction and which is adjustable without requiring disassembly of the VCR piston or disconnection from its associated connecting rod in the engine.

Other objects, features and advantages of the present invention will become apparent from the following description taken in conjunction with the accompanying drawings wherein:

FIG. 3 is an enlarged sectional view taken on the line 3—3 of FIG. 2 illustrating a preferred embodiment of the piston and pressure regulating discharge valve structure of the invention.

FIG. 4 is an elevational view partially in section of a tubular conduit and valve seat member of the valve structure of the present invention shown prior to being fully secured in the piston.

FIG. 5 is a sectional view similar to that of FIG. 3 but illustrating a modified form of the piston and valve structure of the invention.

FIG. 6 is another sectional view similar to that of FIG. 3 but illustrating still another modification of the piston and valve structure of the present invention to be used where low cost is more important than speed compensation.

FIG. 7 is a bottom plan view of the valve operating lever of the embodiment shown in FIG. 6.

Figure 1:
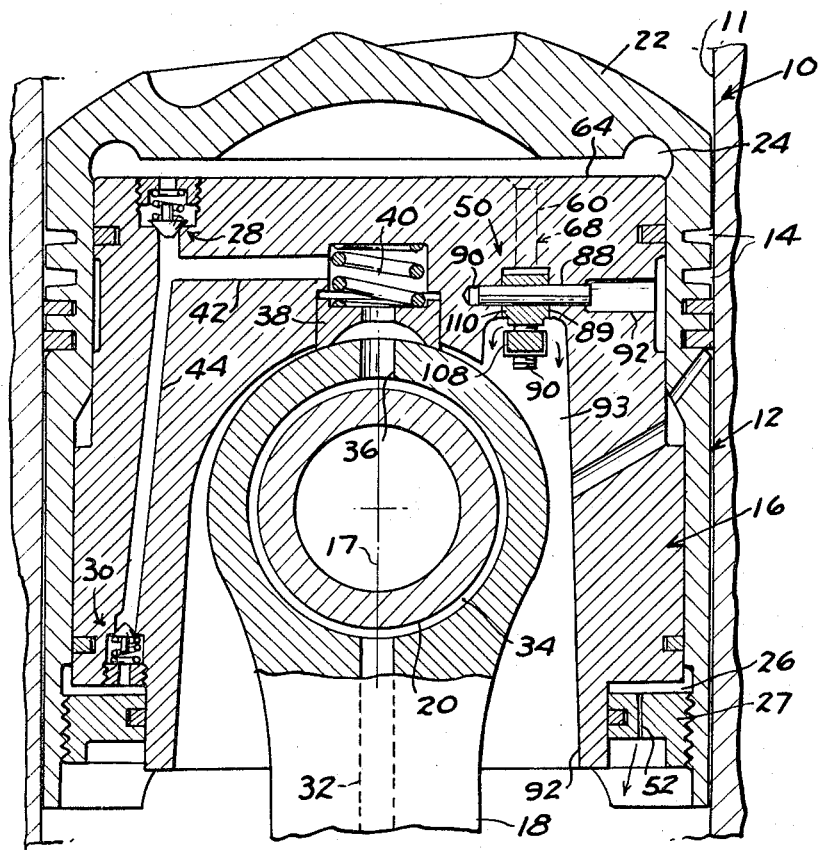
FIG. 1 is a vertical section taken on line 1—1 of FIG. 2 illustrating an improved VCR piston and valve construction in accordance with the present invention.

Referring to FIG. 1, there is shown by way of example a VCR piston 10 adapted for reciprocation in a bore of a cylinder 11 of a four-stroke cycle internal combustion engine. The automatic, hydraulically-actuated VCR piston illustrated in FIG. 1 consists of two main parts: the piston shell 12 (outer member) grooved at 14 to carry piston rings, and the piston carrier 16 (inner member). Carrier 16 is linked to the crankshaft of the engine by a connecting rod 18 and wrist pin 20 and always moves between fixed upper and lower limits, whereas shell 12 is free to move axially within certain limits relative to carrier 16. The relative movement provides a variable height from the center of the wrist pin to the top of the piston crown 22, thus effecting a variation in the compression ratio of the engine through a change in the clearance volume in the engine cylinder without any change in engine displacement.

The relative movement of piston shell 12 is restrained hydraulically by oil contained within an upper chamber 24 formed between crown 22 and the top of carrier 16, and by the oil contained within an annular lower chamber 26 formed between carrier 16 and a ring 27 carried by shell 12. The relative position of shell 12 and carrier 16 with respect to each other is determined by the control of the quantity of oil in, and thus the volumes of, the upper and lower chambers 24 and 26.

Chambers 24 and 26 are filled with lubricating oil supplied through the non-return check valves 28 and 30. Oil from the lubricating system of the engine is fed to valves 28 and 30 by a series of interconnecting passages comprising a passage 32 in rod 18, a groove 34 formed in rod 18 and encircling pin 20, an outlet 36 in rod 18, a spring-loaded slipper collector 38, a spring chamber 40 and passages 42 and 44 in carrier 16.

Oil is discharged from the upper chamber 24 when it exceeds a predetermined pressure therein by means of a preset spring- and/or self-loaded relief valve structure 50 provided in accordance with the present invention and described in more detail hereinafter. During compression and firing, relief valve 50 limits the maximum allowable pressure in chamber 24 which in turn assures that the engine peak firing pressure does not exceed a corresponding predetermined maximum pressure. The relationship between the pressures in chamber 24 and in the combustion chamber depends upon the respective areas exposed to these pressures.

Oil may be controllably discharged from the lower chamber 26 by a restricted orifice 52 in ring 27 to thereby control the amount of relative movement between shell 12 and carrier 16 on the exhaust and intake strokes. Oil discharged from orifice 52 and relief valve 50 returns directly to the crankcase as indicated by the arrows associated therewith in FIG. 1. It is to be understood that as oil is bled via orifice 52 from lower chamber 26 to thereby permit a decrease in the volume of this chamber, the volume of upper chamber 24 increases and is filled with oil through inlet valve 28. Conversely when oil is released by relief valve 50 to permit a decrease in the volume of the upper chamber 24, the volume of the lower chamber 26 increases and is filled with oil through the inlet valve 30.

The general operation of the VCR piston 10 as described thus far is similar to that set forth in the aforesaid U.S. Mansfield patents to which reference may be made for a general understanding of the operation and advantages of VCR pistons. However, it has been found that with the type of conventional spring-loaded discharge valve structures disclosed in the aforesaid Mansfield patents, combustion chamber pressure tends to creep above the desired maximum as the speed of the piston increases. The present invention overcomes this problem by providing an improved speed-compensated relief valve 50 in a novel arrangement in piston 10 to enable the piston to maintain substantially uniform combustion chamber pressure regardless of engine speed. Other important features and advantages of the various embodiments of the improved piston and valve construction of the present invention will become apparent from the following detailed description thereof.

Referring to FIGS. 1–4, carrier 16 has a throughbore 60 extending parallel to the axis of piston 10 with a chamfered upper end 62 (FIG. 4) opening to a top surface 64 of carrier 16 which forms one movable wall of chamber 24. Bore 60 opens at its lower end at an underside surface 66 of carrier 16. As best seen in FIGS. 3 and 4, a combination tubular conduit and valve seat member 68 is mounted in bore 60. Member 68 consists of a cylindrical shank 70 having an outwardly flared upper end 72 disposed tightly against the chamfered conical surface 62. Near the lower end of member 68 a flange 74 extends radially outwardly and around shank 70 in tight abutting relation with surface 66. A cylindrical wall 76 integral with the outer edge of flange 74 extends downwardly therefrom and has a plurality of radial ports 78 spaced circumferentially therearound. Wall 76 extends axially below the lower end 80 of member 68 to form a cage for a flat circular valve disc 82 which in operation moves axially within the confines of wall 76 into and out of abutting contact with a valve seat 83 formed by the annular edge of end 80 to thereby control flow of the high pressure fluid from chamber 24 via the interior passage 84 of member 68. When disc 82 is unseated, fluid flows from passage 84 over the upper surface of disc 82 and radially outwardly through wall 76 via ports 78 to the interior space of carrier 16 which is open to the engine crankcase.

Member 68 is initially made in the form shown in FIG. 4 wherein the cylindrical shank 70 extends all the way to the upper end of the member. While still in this form, member 68 is assembled in carrier 16 with light press fit upwardly into bore 60 until flange 74 abuts surface 66. Then the cylindrical upper end is expanded outwardly tightly against surface 62 in a suitable cold-working operation to thereby permanently retain member 68 firmly in place in the carrier and to seal fluid tight the space between member 68 and bore 60. In this manner the need for additional sealing means, such as washers or gaskets, is eliminated.

In addition to member 68 and valve disc 82, the valve structure of the present invention includes a valve-operating lever 86 (FIGS. 1, 2 and 3) which is fulcrumed on a tubular pin 88 secured in a bore 90 in carrier 16 and which extends across a slot 89 in the carrier which receives lever 86. Bore 90 opens into a counterbore 92 which in turn opens at its outer end to the exterior of carrier 16. Preferably, pin 88 is oriented perpendicular to the axis 21 (FIG. 2) of wrist pin 20 and perpendicular to the axis 17 (FIG. 1) of carrier 16 so that lever 86 pivots in a plane extending parallel to the direction of reciprocation of carrier 16. In addition, lever 86 is offset to one side of the upper end of connecting rod 18 so that an adjusting screw 90 (FIG. 2) threadably carried in an end 91 of lever 86 remote from disc 82 is easily accessible for adjustment by inserting a screwdriver upwardly at a slight angle into the space 93 between the inner periphery 92 of carrier 16 and the rod 18.

As best seen in FIG. 3, lever 86 is laterally split by a slot 96 extending lengthwise from the end 91 toward and into an enlarged opposite end 98 of the lever. End 98 has a round projection 100 extending upwardly therefrom into abutting contact with disc 82. Another projection 102 is provided on end 98 which is drilled out at 104 as required to control the weight of end 98 of the lever. Due to the provision of slot 96, lever 86 may be considered to be a generally U-shaped or bifurcated member comprising an uppper arm 106 and a lower arm 108 disposed parallel to one another and integrally interconnected at end 98 of the lever. Upper arm 106 has a boss 110 which is drilled through for the reception of pin 88 to thereby journal the lever on the carrier. The lower arm portion of end 91 has a threaded bore 114 for threadably receiving screw 90. Screw 90 has an unthreaded shank 116 which extends upwardly through a clearance hole 118 in arm 106. The rounded upper end 120 of screw 90 engages a conical recess 122 of a disc 124 which is disposed in a spring chamber 126 of carrier 16. A coil compression spring 128 is disposed in chamber 126 with its upper end abutting the upper blind end of the chamber and its lower end abutting disc 124.

A connecting pin 130 extends axially through registering holes in arms 106 and 108 located adjacent end 91 of the lever and has retaining heads 132 and 134 at its upper and lower ends respectively. The retaining heads are spaced apart a predetermined distance such that the spaced ends of arms 106 and 108 can separate a given distance as the arms flex apart prior to being restrained against further separation by pin 130.

Figure 2:
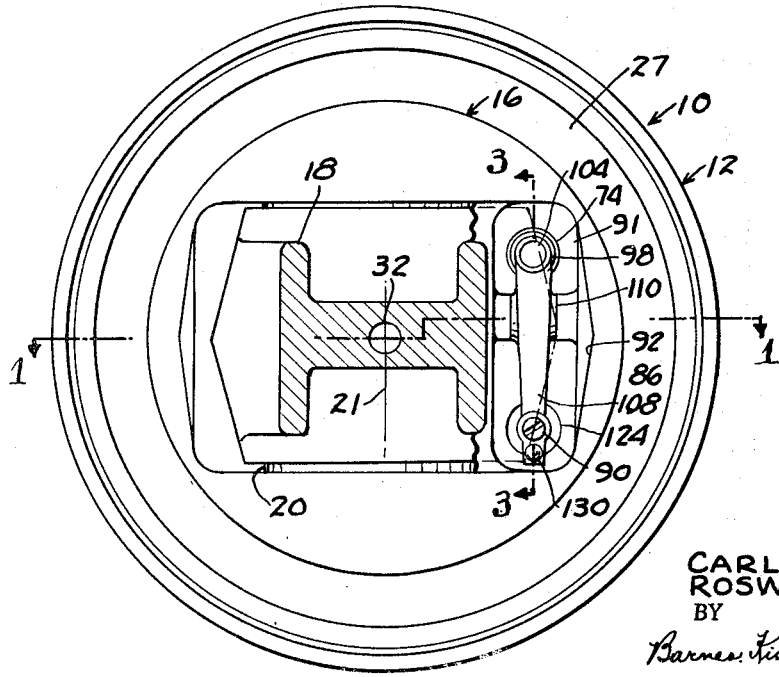
FIG. 2 is a bottom plan view of the piston of FIG. 1 taken partially in section through the associated connecting rod.

In the operation of lever valve construction 50 of FIGS. 1–3, disc 82 is yieldably held in fluid sealing engagement with valve seat 83 by a composite spring force generated both internally in lever 86 and externally by spring 128 acting on arm 108 via screw 90. Screw 90 is spaced farther from the fulcrum of lever 86 than is projection 100 and therefore the valve closing force exerted by spring 128 acts through a longer moment arm than does the oppositely directed force exerted by the pressure of oil acting downwardly on the upper surface of disc 82 exposed to the oil in passage 84. Lever 86 thus operates as a lever of the first class to multiply the valve closing force exerted by spring 128.

However, for a lower range of pressure, lever 86 is not designed to operate as a true rigid member but rather to flex in response to bending stresses imposed on arm 108 by the load hydraulic pressure acting on disc 82. Thus when valve assembly 50 is used to maintain a given maximum combustion chamber pressure from zero up to a given upper limit of say 800 p.s.i., the proportions of spring 128 are selected so that it does not permit movement of the valve until the combustion pressures exceed said given value. Thus, during operation in this lower range, lever 86 is essentially self-biasing and will flex to allow unseating of disc 82 when the fluid pressure in passage 84 reaches a value corresponding to the desired maximum combustion chamber pressure. This yielding movement of lever 86 results from lower arm 108 bending downwardly as end 98 is forced counterclockwise about the axis of pin 88, screw 90 serving to support the opposite end 91 of arm 108 fixed against movement. The extent of such movement is dependent on the stress-strain bending characteristic of arm 108 and end 98. As arm 108 flexes under this stress into a bowed contour, the free end of upper arm 106 moves upwardly away from arm 108 since the free end of arm 106 is unrestrained within the limits of the lost motion connection provided by connecting pin 130. The lost motion travel of arm 106 is sufficient to accommodate maximum bending strain of arm 108 resulting from pressure relief operation in the aforesaid lower range of combustion pressures.

In this pressure relief operation the gas pressure acting on piston crown 22 during the compression and power strokes is transmitted to carrier 16 through the oil in chamber 24, creating a high oil pressure in this chamber. Whenever the gas pressure exceeds the selected upper limit, the corresponding oil pressure built up in chamber 24 and passage 84 opens disc 82, thereby releasing sufficient oil to allow shell 12 to move downwardly relative to carrier 16, thus decreasing the compression ratio of the engine.

Due to the aforementioned limited freedom of pivotal movement of upper arm 106 permitted by pin 130, the inertial forces acting on arm 106 are effective to produce a desirable speed-compensating effect on the operation of the valve 50 which overcomes the previously-described tendency of the combustion chamber pressure to creep above the desired maximum as the speed of the piston increases. Since the center of gravity of arm 106 is disposed between the axis of pin 88 and the unattached end of arm 106, the inertial forces acting on arm 106 as piston 10 decelerates in approaching top dead center and then accelerates in the opposite direction after passing top dead center are resolved into a force acting at the center of gravity parallel to the axis of carrier 16 and in a direction toward the top of piston 10. This resultant inertial force thus produces a counterclockwise torque on lever arm 106 which is opposite to the clockwise valve closing torque developed by the bending resistance of lower arm 108. This inertial loading on arm 106 increases in proportion to the square of engine r.p.m. and acts as an opening force on valve 82 which varies with engine r.p.m. and with the cyclical variation in the position of piston 10. In a four-stroke cycle engine, the latter variation occurs at double the frequency of, but substantially in phase with, the cyclical variation in combustion chamber pressure, the inertial force and combustion chamber pressure both reaching their maximum when piston 10 is in the vicinity of top dead center.

As a result of the inertial loading of valve 50, the force required to open valve disc 82 is reduced as engine r.p.m. increases. This enables valve 82 to discharge the required volume of oil from chamber 24 for balancing a unit increase in combustion chamber pressure regardless of piston speed. Thus, by providing the aforementioned orientation of lever 86 relative to opening and closing movement of valve 82 and to piston travel and the combustion chamber, the desired maximum combustion chamber pressure will be maintained by piston 10 at a substantially uniform value.

A further feature of the split lever valve 50 is its ability to regulate combustion chamber pressures above the aforementioned predetermined value which, for purposes of illustration, was given as 800 p.s.i. For pressures above 800 p.s.i., the bending strain of arm 108 is such that the lost motion spread between arms 106 and 108 is fully taken up by pin 130, the arms then being rigidly interconnected at their remote ends by pin 130. Beyond this point, arm 106 reinforces arm 108 so that it is not strained beyond its elastic limit. Hence when operating in this higher range, lower arm 108 is permanently bowed to the full extent permitted by pin 130 and spring 128 becomes the yielding member. Thus, in the upper range of regulation, lever 86 acts as a rigid member which pivots about pin 88 in response to the forces exerted by oil pressure on disc 82 and by spring 128.

In this upper range of operation, valve 50 still provides the aforementioned speed compensating effect due to the center of gravity of lever 86 being disposed on the side of pin 88 remote from valve 82. The resultant inertial force acting on lever 86 thus exerts a counterclockwise torque which varies with engine r.p.m. and opposes the valve closing force of spring 128 to a greater extent at high speeds than at low speeds.

Referring to FIG. 5, there is shown a modification of the lever valve construction of the present invention which differs from valve 50 of FIGS. 1-3 primarily in the use of a solid rigid lever 150 as distinguished from the split, flexible lever 86. Lever 150 comprises a short arm 152 having a spherical protuberance 154 formed on its upper side adapted to abut disc 82 to press the same against its seat on member 68. Arm 152 is integrally joined to a longer arm 156 by a cylindrical boss 158 which is journalled on pin 88. The end of arm 156 remote from pin 88 threadably carries an adjusting screw 160 disposed similar to screw 90 with its screw driver slot 162 facing the lower open end of piston 10. The upper pointed end of screw 160 abuts against a flat face spring follower 164. Spring 128 abuts at its lower end against follower 164 and at its upper end against the top wall of a cup-shaped spring housing 166 which is fitted in a vertical blind bore 168 formed in carrier 16.

Lever 150 is intended for use in high pressure applications wherein the valve closing force is developed solely by spring 128. Lever 150 operates generally in the same manner as lever 86 when the latter is in its locked up condition, providing a lever of the first class to multiply and translate the force exerted by spring 128 into an upwardly acting force on disc 82 to hold the same against its seat until fluid pressure in chamber 24 exceeds the valve closing force. The pressure regulating setting of the lever valve structure of FIG. 5 is adjusted by threading screw 160 in arm 156 to thereby compress or release spring 128 as required to obtain the desired preloading of the valve.

Referring to FIGS. 6 and 7, there is shown a further modification of the lever valve structure of the present invention which is intended for use in regulating combustion chamber pressures which are of a lower order of magnitude than those for which lever 150 is used. In this embodiment, a lever 180 is provided which consists of a short arm 182 carrying a semi-spherical proturberance 184 adapted to abut disc 182 for holding the same against its seat. Arm 182 is integrally joined to a longer and thinner arm 186 by a cylindrical boss 188 which is journalled on pin 88. The end 187 of arm 186 remote from disc 82 threadably carries an adjusting screw 190 having a screw drive slot 192 disposed toward the open lower end of piston 10. The upper end of screw 190 has a reduced diameter projection 194 received in a pilot hole 196 formed in carrier 16, and a thrust flange 198 which abuts the underside 66 of carrier 16. The present embodiment dispenses with a coil spring, valve closing force being developed solely through flexing of lever 180, and primarily through bending of the long arm 186 thereof. To adjust discharge pressure, screw 190 is threaded in arm 186 until arm 186 is deflected away from surface 66 by an amount sufficient to provide the required prestress to hold disc 82 on its seat until the selected discharge pressure is reached. When this pressure is exceeded, the counterclockwise torque acting on lever 180 will cause arm 186 to flex and bow upwardly, thereby permitting sufficient pivotal movement of lever 180 to unseat disc 82 for discharge of oil from chamber 24. Although lever 180 is not designed to produce a speed compensating effect to the same extent as levers 186 and 150, a lesser degree of speed compensation can be obtained by suitably designing lever 180 such that its center of gravity is located between pin 88 and screw 190. When so designed, the inertial forces acting on lever 180 will develop a counterclockwise moment in phase with peak oil pressure tending to unseat disc 82 and thus adding to the bending stress acting on arm 186.

Another feature of the present invention common to all embodiments thereof is that the desired relief pressure is adjustable by threading screws 90, 160 or 190 in or out of their respective arms to vary the bending and/or spring stress tending to hold disc 82 closed on its seat. This adjustment may be made without disconnecting piston 10 from rod 18 since screws 90, 160 or 190 may be reached with a screw driver from the open lower end of the carrier 16 due to the offset location of the adjusting screw relative to the upper end of rod 18. This in turn facilitates service and adjustment of an engine since maximum gas pressures in the engine cylinders may be adjusted without disassembling pistons 10 or the engine except to remove the crankcase pan.

From the foregoing description, it will now be apparent that the present invention provides in its various embodiments an improved speed compensated piston and regulating valve construction which fulfills the stated objects in a simple, reliable and economical manner to provide improved performance and more uniform regulation of combustion chamber pressure.

We claim:
1. In an internal combustion engine piston having first and second parts movable relative to one another in response to reciprocation of the piston in an engine cylinder between a combustion chamber and crankcase of the engine, a pressure fluid chamber within said piston which varies in internal volume in response to said relative movement and to variations in the quantity of pressure fluid therein, one of said parts including means forming a fluid flow passage communicating with said chamber, and a valve member carried by said one part movable to open and close said passage for controlling the flow of fluid therethrough to thereby vary the quantity of fluid in said chamber; the improvement which comprises means including a lever for yieldably biasing said valve member toward closed position to thereby regulate the pressure of the fluid in said chamber and means mounting said lever on said one part for pivotal movement in a plane disposed parallel to the axis of the piston for opening and closing said valve member in response to the pivotal movement of said lever, said lever and said valve member being oriented relative to one another and to the direction of reciprocation of the piston for operable movement such that the resultant of inertial forces acting on said lever during the opening movement of said valve member when the piston is adjacent the combustion chamber exerts a force on said lever tending to open said valve member.

2. The combination set forth in claim 1 further including adjustable means threadably carried by said lever for varying the biasing force exerted by said biasing means via said lever on said valve member.

3. The combination set forth in claim 1 wherein said flow passage means comprises a bore in said one part extending parallel to the axis of the piston from said chamber to a crankcase side of said one part and having a mouth at the chamber end of said bore and a shoulder adjacent the crankcase end of said bore, and a lining tube disposed in said bore having one end projecting from said one part beyond said shoulder adapted to serve as a valve seat for said valve member and having a flange abutting said shoulder, said tube also having an end portion disposed in said mouth of said bore expanded outwardly complemental thereto to thereby tightly secure said tube in said bore.

4. The combination set forth in claim 3 wherein the seat end of said tube has a seating surface disposed in a plane perpendicular to the axis of the tube and said valve member comprises a disc adapted to seat against said tube seating surface.

5. The combination set forth in claim 1 wherein said lever is adapted to develop closing force on said valve member through bending of said lever in response to movement of said valve member.

6. The combination set forth in claim 5 including an adjusting screw threadably secured in said lever and operably interposed between said lever and said one part for varying the bending stress developed in said lever.

7. The combination set forth in claim 1 wherein said lever is pivotally mounted to operate as a lever of the first class and has a predetermined shape such that the center of gravity of the lever is disposed on the side of said lever mounting means remote from said valve member, said lever and said valve member being oriented such that closing movement of the valve member is in a direction parallel to the axis of the piston and toward the combustion chamber end of the piston.

8. The combination set forth in claim 7 wherein said lever comprises a rigid member having first and second moment arms, said first arm acting on the valve to close it and said second arm being longer than said first arm, said biasing means including a compression coil spring interposed between said one part and said second moment arm whereby said lever multiplies the force of said spring and transmits said force as a closing force on said valve member.

9. The combination set forth in claim 7 wherein said lever has a longitudinal slot therein extending from a first end of the lever remote from said valve member lengthwise thereof to a point near a second end of said lever adjacent said valve member to thereby define a pair of laterally spaced arms, said lever mounting means comprising a pivot pin mounted in said one part and a portion of one of said arms journaled on said pin to provide the fulcrum for said lever, the other of said arms having an adjusting screw threaded therethrough adjacent said first end, said one arm being apertured to freely receive said adjusting screw therethrough, said screw extending beyond said one arm, said biasing means comprising said other arm and a spring supported on said one part adjacent said first end of said lever and operably connected to said screw, and means forming a lost motion connection between said arms adjacent said first end of said lever adapted to positively interconnect the arms upon the same spreading a predetermined distance apart in response to a predetermined bending stress being imposed on said other arm in response to forces exerted by said valve member and spring on said lever.

10. In combination, means bodily movable in a reciprocating motion and forming a chamber containing pressure fluid subjected to periodic pressure changes of varying frequency occurring in phase with reversal of the reciprocating motion, means forming a fluid flow passage communicating with said chamber, a valve member carried by said reciprocating means movable parallel to the direction of the reciprocating motion for opening and closing said fluid flow passage, biasing means including a lever biasing said valve member closed and yieldable to permit said valve member to open in response to chamber pressure fluid acting on said valve member, said lever being fulcrumed on said reciprocating means and having a first moment arm operably connected to the valve member and a second moment arm of greater length than said first moment arm, said biasing means further including a spring operably interconnecting said second moment arm and said reciprocating means and developing a biasing force translated by said lever into a closing force acting on said valve member, said lever being oriented relative to movement of said valve member and reciprocating means such that the force developed by said biasing means acting on said valve member to close the same is modulated by the inertial force acting on said lever to thereby modulate pressure regulating movement of said valve member such that it controls flow via said passage of substantially equal pressure regulating increments of the pressure fluid regardless of the rate of change of fluid pressure in the chamber.

11. In an internal combustion engine, a cylinder, a piston reciprocable in said cylinder comprising an inner carrier and an outer shell carried on said carrier and axially movable relative thereto in response to reciprocation of the piston in the cylinder between the cylinder combustion chamber and the crankcase of the engine, said carrier having an internal cavity formed therein opening toward the crankcase, a wrist pin carried in said carrier and extending across said cavity, a connecting rod having one end pivotally connected to said carrier by said wrist pin, a pressure fluid chamber within said piston which varies in internal volume in response to said relative movement and to variations in the quantity of pressure fluid therein, said carrier including means forming a fluid flow passage communicating with said chamber and with said cavity, a valve member carried by said carrier movable to open and close said passage for controlling the discharge of fluid from said chamber via said passage to thereby vary the quantity of fluid in said chamber, means including a lever pivotally mounted on said carrier and exposed to said cavity for yieldably biasing said valve member toward closed position to thereby regulate the pressure of the fluid in said chamber, said cavity being shaped to define a clearance space between a wall thereof and said end of said connecting rod and extending to the open end of the cavity, and an adjusting screw threadably carried by said lever for varying the biasing force exerted by said biasing means via said lever on said valve member, said lever being screw disposed in said clearance space whereby said screw is accessible for adjustment via the clearance space.

12. An internal combustion engine piston having first and second parts movable relative to one another in response to reciprocation of the piston in an engine cylinder between a combustion chamber and crankcase of the engine, a pressure fluid chamber within said piston which varies in internal volume in response to said relative movement and to variations in the quantity of pressure fluid therein, means for supplying pressure fluid to said chamber, one of said parts including means forming a fluid flow discharge passage communicating with said chamber, a valve member carried by said one part movable to open and close said discharge passage for controlling discharge of fluid therethrough to thereby vary the quantity of fluid in said chamber and biasing means including a lever for yieldably biasing said valve member toward closed position to thereby regulate the pressure of the fluid in said chamber.

13. The combination set forth in claim 12 wherein said lever has a moment arm adapted to bend in response to movement of said valve member and develop force tending to close said valve member, said valve member being yieldably biased closed by said biasing means solely by bending stress developed in said moment arm.

No references cited.

MARK NEWMAN, *Primary Examiner.*

W. E. BURNS, *Assistant Examiner.*